United States Patent [19]
Ise et al.

[11] Patent Number: 5,471,339
[45] Date of Patent: Nov. 28, 1995

[54] ELECTROCHROMIC DIAPHRAGM DEVICE

[75] Inventors: Koichi Ise, Chiba; Yasuo Nishida; Akio Yasuda, both of Tokyo, all of Japan

[73] Assignee: Sony Corporation, Tokyo, Japan

[21] Appl. No.: 209,713

[22] Filed: Mar. 14, 1994

[30] Foreign Application Priority Data

Mar. 19, 1993 [JP] Japan ..................... 5-060753

[51] Int. Cl.⁶ .................................. G02F 1/153
[52] U.S. Cl. .................. 359/275; 359/269; 354/226; 354/227.1
[58] Field of Search ..................... 359/265, 266, 359/269, 270, 271, 273, 275; 354/226, 227.1, 228

[56] References Cited

U.S. PATENT DOCUMENTS

| | | | |
|---|---|---|---|
| 4,147,416 | 4/1979 | Shimizu | 350/357 |
| 4,167,308 | 9/1979 | Barclay et al. | 350/357 |
| 4,218,120 | 8/1980 | Kawamura et al. | 354/227 |
| 4,480,269 | 10/1984 | Yoshida et al. | 358/209 |
| 5,073,011 | 12/1991 | Ito et al. | 359/266 |

FOREIGN PATENT DOCUMENTS

| | | |
|---|---|---|
| 2523734 | 9/1983 | France . |
| 62-198835 | 9/1987 | Japan . |

OTHER PUBLICATIONS

EPO Search report.

*Primary Examiner*—Georgia Y. Epps
*Assistant Examiner*—Dawn-Marie Bey
*Attorney, Agent, or Firm*—Ronald P. Kananen

[57] ABSTRACT

A small-sized diaphragm device for an image pickup lens system having an electrochromic element the light transmitting properties of which are changed on application of an electrical voltage. The diaphragm device also includes a first set of plural concentrically arranged transparent electrodes, a second set of plural concentrically arranged transparent electrodes and third electrodes formed on the outermost peripheries of these sets of transparent electrodes for acting as counter-electrodes for the transparent electrodes. The diaphragm device has a sufficient light transmittance when in the transparent state, while having high light interrupting properties when in the light interrupting state.

4 Claims, 7 Drawing Sheets

ELECTROCHROMIC DIAPHRAGM DEVICE

FIELD OF THE INVENTION

This invention relates to a diaphragm device for an image pickup lens system which is provided with an electrochromic element having its light passing properties changed on application of an electric voltage, and in which the volume of light transmission may be controlled by the light passing properties of the electrochromic element.

BACKGROUND OF THE INVENTION

In a well-known manner, an electrochromic element exhibits different light transmitting properties between its oxidized state and its reduced state as a result of an electrochemical reaction. The electrochromic element is used for controlling the volume of light transmission of the incident light thereon by taking advantage of the difference in the light passing properties thereof. The electrochromic element comprises a thin film formed of an electrochromic material, such as $WO_3$ or $WOD_3$, placed in contact with an electrolyte, such as a film-shaped lithium electrode. If the electrical voltage is forced in a direction in which the electrolyte side becomes a positive side, the state of the element is changed.

In the case of a colorless $WO_3$ thin film, for example, if the negative voltage is applied thereto, $M_x{}^+WO_{3ex^-}$ are formed by injection of electrons and positive ions in the electrolyte, with the thin film being changed from the colorless state into the state presenting a blue color. Consequently, if plural electrochromic elements presenting different colors in different wavelength regions are placed one on the other for taking advantage of the electric and light passing properties thereof, it becomes possible to control the volume of light transmission for the entire range of the visible light.

Figure 7:
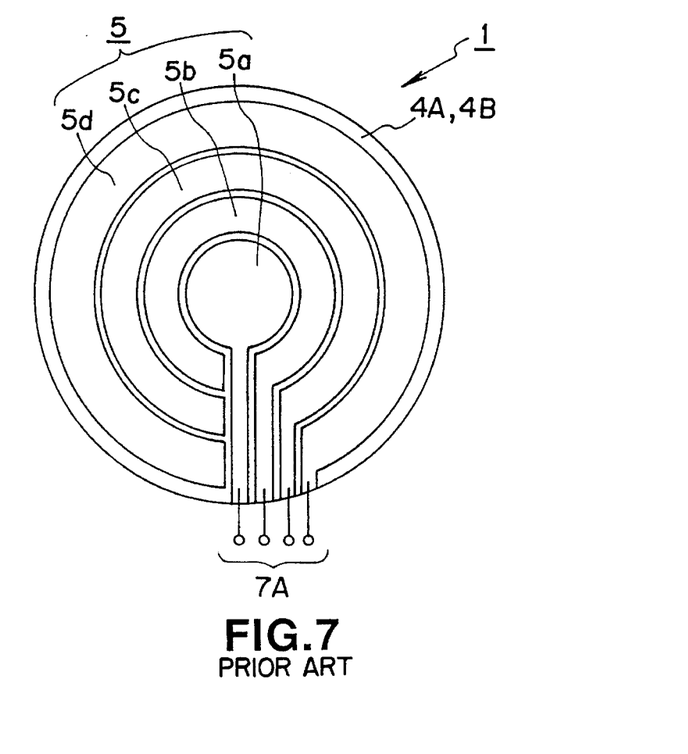
FIG. 7 is a front view showing a conventional diaphragm device.
Figure 8:
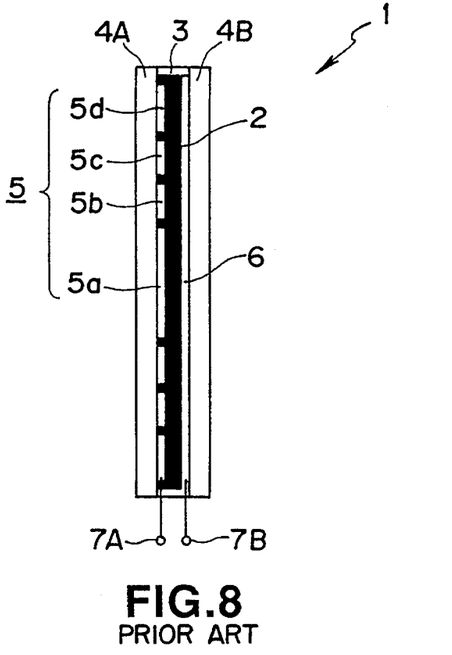
FIG. 8 is a longitudinal sectional view thereof.

There has hitherto been proposed a diaphragm device for an image pickup lens system, such as a camera, which takes advantage of the above-mentioned electrical and light transmitting properties of the electrochromic elements, in e.g. JP Patent Kokai (Laid-Open) Publication No.62-198835, entitled "Diaphragm Device". The diaphragm device according to the prior-art Publication has an electrochromic element 2 sandwiched and enclosed between a pair of transparent substrates 4A, 4B, along with an electrolyte, by means of a spacer 3, and a first set of transparent electrodes 6 and a second transparent electrode 6, mounted within the interior of the transparent substrates 4A and 4B in contact with the front and reverse surfaces of the electrochromic element 2, as shown in FIGS. 7 and 8.

At least the first set of transparent electrodes 5 are made up of plural concentrically arranged transparent electrodes 5a to 5d, while the second transparent electrode plays the role of a counter-electrode for the set of transparent electrodes 5. The electrical voltage is applied across the transparent electrodes 5 and 6 via terminals 7A and 7B from the outermost transparent electrode towards the innermost transparent electrode in this order. Beginning from the annular areas of the diaphragm device 1 in register with the outer most transparent electrode 5d, the annular areas of the diaphragm device 1 in register with the transparent electrodes 5 are changed from the transparent state to the light interrupting state, in a direction of proceeding towards the annular area in register with the inner most transparent electrode 5a, for reducing the transmitting diameter for the incident light for controlling the volume of the transmitted light to a desired level.

Meanwhile, it is demanded of the diaphragm device 1 for the camera having the electrochromic element 2 to exhibit optical characteristics in which a sufficient amount of the incident light is transmitted in the transparent state and the incident light is positively interrupted in the light interrupting state. The light interrupting properties of the diaphragm device is particularly crucial if it is desired to control the depth of field by changing the size of the aperture of the diaphragm or if it is desired to decrease the aberration by reducing the effective lens diameter for improving lens characteristics.

It is now assumed that, in the prior-art diaphragm device 1, the F number during the maximum opening of the diaphragm, with the areas in register with the transparent electrodes 5a to 5d being transparent, is 1.4, the F number during the minimum opening of the diaphragm, with only the area in register with the inner most transparent electrode 5a being transparent, is 8, the ratio of light transmission of the electrochromic element 2 being 100% during the time of transmission and 1% during light interruption, respectively, and the ratio of light transmission of the transparent electrodes 5 and 6, each having the ratio of light transmission equal to 10%, is equal to $(1-0.1)^2=0.9^2$. The ratio of the light volume leaking from the light interrupting area to the light volume transmitted through the transparent area at the time of the minimum opening of the diaphragm device, that is the S/N ratio, may be calculated from the formula:

(light volume leaking from areas in register with the transparent electrodes 5b, 5c and 5d)/(light volume transmitted through an area in register with the transparent electrode 5a) (surface measures of areas in register with the transparent electrodes 5a to 5c)×(light transmittance)/(surface measure of an area in register with the transparent electrode 5a)×(light transmittance)

Substituting the above values into the above formula, the S/N ratio becomes equal to $[(8/1.4)^2-1]\times(0.01\times0.9^2)/1\times(1\times0.9^2)=0.32$.

It will be seen from the foregoing that the light volume leaking from the annular light interrupting areas in register with the transparent electrodes 5b, 5c and 5d amounts to 30% or more because of the larger surface area so that the light interrupting properties demanded of the diaphragm device 1 for the camera cannot be met. The result is that the depth of focus becomes uncontrollable due to the light leaking from the areas in register with the transparent electrodes 5b to 5d of shallow depth, while the effect which the decreased effective lens diameter might have on the progressive decreasing of the lens aberration also becomes unsatisfactory due to the leaking light.

Figure 9:
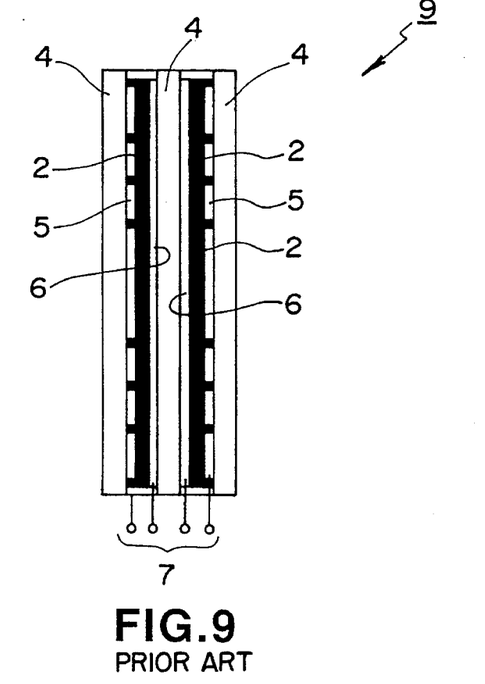
FIG. 9 is a longitudinal sectional view of another conventional diaphragm device.

For combatting such inconvenience, there has also been proposed a diaphragm device 9 in which two diaphragm devices 1 are stacked for improving the light interrupting characteristics, as shown in FIG. 9. In the diaphragm device 9, the parts or components which are similar to those of the diaphragm device 1 shown in FIGS. 7 and 8 are depicted by the same numerals and the corresponding description is not made herein for clarity. With the present diaphragm device 9, since the incident light is caused to pass through two layers of the electrochromic elements 2 and four layers of the transparent electrodes 6 and 7, the S/N ratio may be found from the formula (1) by $[(8/1.4)^2-1]\times0.01^2\times0.9^4/1\times(1^2\times0.9^4)=0.0032$.

It may be seen that, with the diaphragm device 9, made up of six layers, that is two layers of the electrochromic elements 2 and four layers of the transparent electrodes 5, 6, the light volume leaking from the annular light interrupting areas in register with the transparent electrodes 5b, 5c and 5d during the minimum opening of the diaphragm becomes 1/100 of that of the diaphragm device 1. The result is that the light interrupting properties may be improved significantly, while the light transmitting properties in the transparent state and the light interrupting properties in the light interrupting state demanded of the diaphragm device for the image pickup lens system for the camera or the like may also be met.

However, with the diaphragm device 9, shown in FIG. 9, in which the light interrupting properties are improved by the above-described arrangement, the overall thickness is substantially twice that of the diaphragm device 1 shown in FIGS. 7 and 8, such that, due to such increase in thickness of the diaphragm device 9, the thickness of the overall optical system becomes approximately thrice that of the optical system having the diaphragm device shown in FIGS. 7 and 8.

Besides, since the incident light must pass through the four layers of the transparent electrodes 6 and 7, the light volume of the transmitted light during the light-passing state is decreased significantly. For example, if indium- thin-oxide (ITO) having superior light transmittance is used as a material for the transparent electrode, the ratio of light transmission per each layer of the transparent electrodes is decreased by about 10% due to the light absorption by the transparent electrodes, such that the light transmittance of the diaphragm device 9 in its entirety amounts to a higher value of $(1-0.1)^4 \approx 0.66$.

OBJECT AND SUMMARY OF THE INVENTION

It is therefore an object of the present invention to provide a diaphragm device in which sufficient light transmittance and high light interrupting properties may be maintained during the transparent state and the light interrupting state, respectively, and which is small-sized and advantageously employed with an image pickup lens system.

In its one aspect, the present invention provides a diaphragm device in which an electrochromic element the light transmitting properties of which are changed on forcing an electrical voltage thereacross is provided along with a first set of transparent electrodes and a second set of transparent electrodes. Each of the first and second set has a concentric array of a plurality of transparent electrodes. The first set of the transparent electrodes and the second set of the transparent electrodes are arranged on both sides of the electrochromic element. The third electrodes playing the part of counter-electrodes for the first and second sets of the transparent electrodes are arranged on the outer most peripheries of the first and the second set of the transparent electrodes.

In its second aspect, the present invention provides a diaphragm device employed in an optical system in which an electrochromic element the light transmitting properties of which are changed on forcing an electrical voltage thereacross is provided along with a first set of transparent electrodes and a second set of transparent electrodes. Each of the first and second set has a concentric array of a plurality of transparent electrodes. The first set of the transparent electrodes and the second set of the transparent electrodes are arranged on both sides of the electrochromic element. The third electrodes playing the part of counter-electrodes for the first and second sets of the transparent electrodes are arranged on the outer most peripheries of the first and the second set of the transparent electrodes outside of the effective diameter of the optical system. The counter-electrodes are bent along the optical axis and preferably in parallel with the optical axis with respect to the first and second sets of the transparent electrodes.

If the electrical voltage is sequentially applied to the first and second sets of the transparent electrodes arranged on both sides of an electrochromic element and the third electrodes arranged as counter-electrodes for these transparent electrodes, the light interrupting layers may be formed on the front and reverse surfaces of the electrochromic element, so that sufficient light-interrupting properties may be maintained under the light interrupting state without increasing the thickness of the diaphragm device.

Since the first and second sets of the transparent electrodes are each made up of plural concentrically arranged transparent electrodes, the light transmitting diameter for the incident light is gradually diminished by sequentially applying the electrical voltage to the transparent electrodes, beginning from the outermost transparent electrodes, for realization of the light stop effects.

Since the third electrodes arranged on both sides of the electrochromic element so as to play the role of the counter-electrodes for the transparent electrodes of the first and second sets are arranged outside of the effective diameter of the image pickup lens system, the lens barrel may be prevented from being increased in size. Besides, the counter-electrodes are bent in parallel with the optical axis for further preventing the lens barrel from being increased in diameter.

According to the present invention, the first and second sets of the transparent electrodes, each made up of plural concentrically arranged transparent electrodes, are arranged on the front and reverse surfaces of the electrochromic element, and third electrodes playing the role of counter-electrodes are arranged on the outermost peripheries of the transparent electrodes of the first and second sets. The electrical voltage is sequentially applied to the third electrodes and to the transparent electrodes of the first and second sets, beginning from the outermost transparent electrodes, for sequentially forming concentric light interrupting layers, so that the effect of gradually decreasing the diameter for the incident light is achieved. Besides, the overall thickness is not increased, while sufficient light stop characteristics may be maintained under the light stop state.

On the other hand, the first and second sets of the transparent electrodes are arranged on the front and reverse surfaces of the electrochromic element, while the third electrodes playing the part of the counter-electrodes for the transparent electrodes of the first and second sets are arranged outside of the effective diameter of the optical system, so that a small-sized high-performance image pickup lens system may be realized without increasing the diameter or the length of the lens barrel.

Furthermore, by bending the third electrodes, playing the part of counter-electrodes for the first and second sets of the transparent electrodes for controlling the transmission diameter for the incident light, in a direction parallel to the optical axis, the lens barrel may be decreased further in diameter. The diaphragm of the present invention may be used most advantageously in conjunction with a front iris type image pickup lens system in which the diaphragm device is arranged ahead of the front lens unit.

DETAILED DESCRIPTION OF PREFERRED EMBODIMENTS

Figure 1:
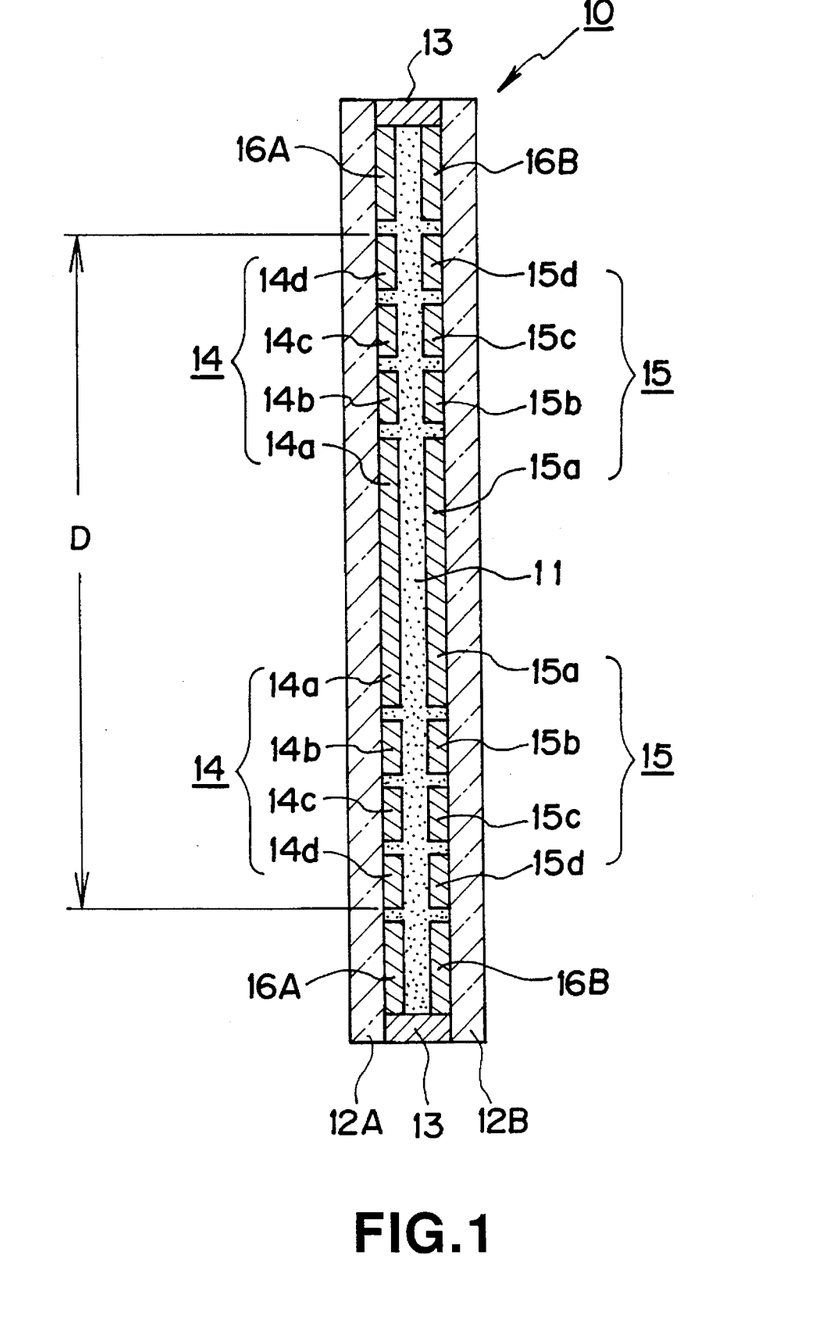
FIG. 1 is a longitudinal cross-sectional view of a diaphragm device according to a first embodiment of the present invention.
Figure 2:
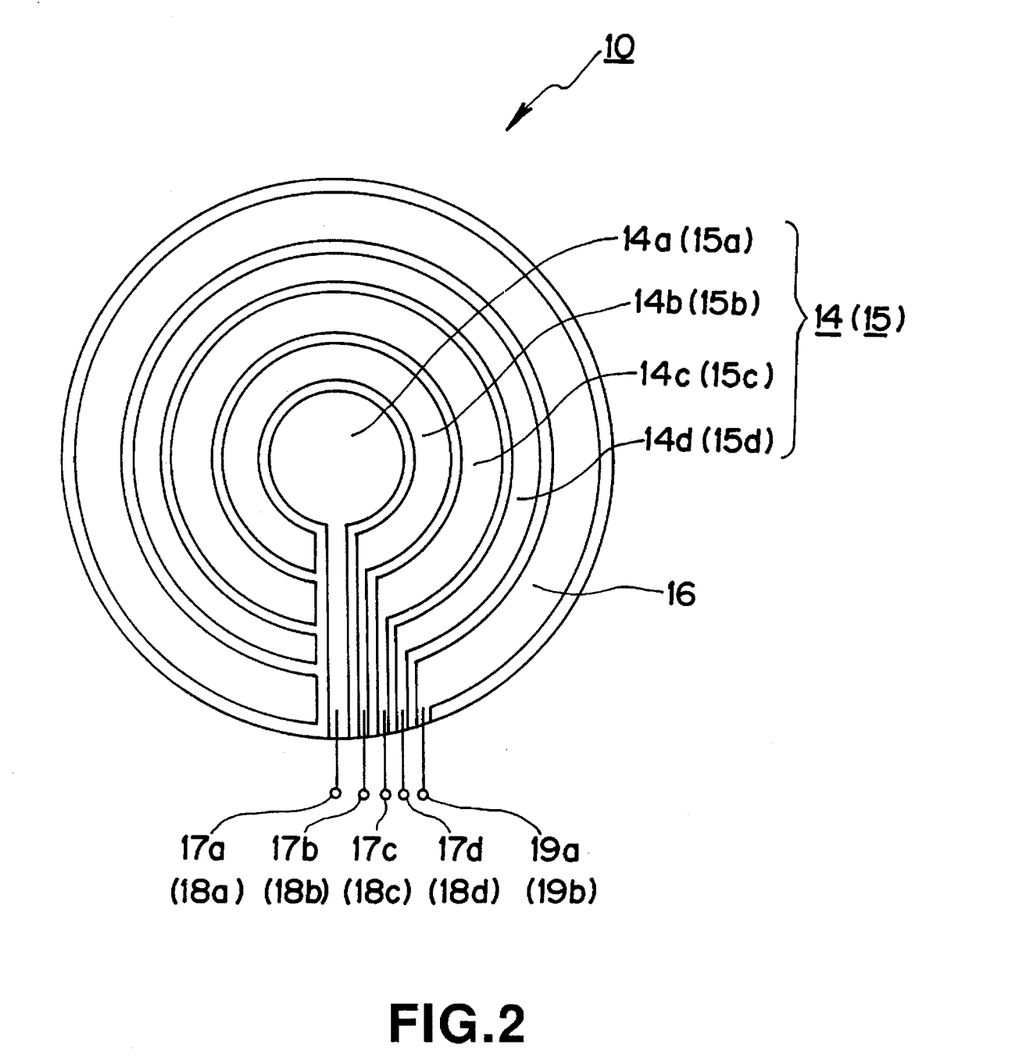
FIG. 2 is a front view of the diaphragm device shown in FIG. 1.

Referring to the drawings, preferred embodiments of the present invention will be explained in detail. A diaphragm device 10 includes an electrochromic element 11, comprised of silver iodide and sodium iodide dissolved in a non-aqueous solvent, such as methanol, as shown in FIGS. 1 and 2. The electrochromic element 11 is enclosed between a pair of transparent glass substrates 12A and 12B by the interposition of a spacer 13.

On the opposite inner surfaces of the glass substrates 12A and 12B, a set of first transparent electrodes 14, made up of plural concentrically arranged transparent electrodes 14a to 14d, a set of second transparent electrodes 15, similarly made up of plural concentrically arranged transparent electrodes 15a to 15d, and concentrically arranged ring-shaped third transparent electrodes 16A and 16B on the outer most periphery of the first and second transparent electrode sets 14 and 15. In other words, the set of the first transparent electrodes 14 and the third transparent electrode 16A are arranged in contact with the front surface of the electrochromic element 11, while the second set of transparent electrodes 15 and the other transparent electrode 16B are arranged in contact with the reverse surface of the electrochromic element 11.

The first set of the transparent electrodes 14, the second set of the transparent electrodes 15 and the third transparent electrodes 16A and 16B are formed by coating a transparent electrically conductive paste or pattern-printing a transparent electrically conductive film on the inner lateral surfaces of the glass substrates 12A and 12B. Although not shown precisely in FIGS. 1 and 2 for simplicity of illustration, the sum of the surface areas of the transparent electrodes 14a to 14d of the first set of the electrodes 14 is approximately equal to the surface area of the third transparent electrode 16A, while the sum of the surface areas of the transparent electrodes 15a to 15d of the third set of the electrodes 15 is approximately equal to the surface area of the third transparent electrode 16B, The third transparent electrodes 16A and 16B constitute counter-electrodes of the first set of the transparent electrodes 14 and the second set of the transparent electrodes 15, respectively. That is, in a variety of optical elements the light transmission characteristics of which are changed by forcing the electrical voltage, such as liquid crystal device, the molecular arrangement of the device is modified by the electrical field applied uniformly across the electrodes, whereby the light passing characteristics thereof are modified. Thus the electrodes are arranged with the liquid crystal device sandwiched in-between.

Conversely, with the electrochromic elements, the light transmission characteristics are changed by exchange of electrical charges between the electrode and the electrochromic element facing thereto, so that it does not matter in which direction or how uniform the electrical field is oriented. In other words, the transparent electrodes 14, 15 and 16 controlling the light transmission characteristics of the electrochromic element 11 may be arranged at desired arbitrary positions. Therefore, in the first aspect of the present invention, the third transparent electrodes 16A, 16B, as the counter-electrodes, are arranged in accordance with the above-described feature of the electrochromic element, at the outer most peripheries of the first set of the transparent electrodes 14 and the second set of the transparent electrodes 15.

The transparent electrodes 14b, 14c and 14d of the first set of the transparent electrodes 14 are arranged concentrically with the innermost transparent electrode 14a as its center, while the transparent electrodes 15b, 15c and 15d of the second set of the transparent electrodes 16 are arranged concentrically with the inner most transparent electrode 15a as its center. Thus the electrode sets 14, 15 act as electrodes controlling the transmission aperture diameter of the incident light. On the other hand, the outermost third transparent electrode 16 acts as the common counter electrode for the first and second sets 14, 15 of the transparent electrodes. In the second aspect of the present invention, the third transparent electrode 16 is arranged outwardly of the effective diameter D of the optical system, as will be explained subsequently.

The first set of the transparent electrodes 14, the second set of the electrodes 15 and the third transparent electrodes 16 are partially led outwards to the outer periphery of the glass substrate 12 and connected thereat to terminals 17a to 17d, 18a to 18d and 19a, 19b which are adapted for forcing the electrical voltage to these transparent electrodes, as shown in FIG. 2. That is, the transparent electrodes 14a to 14d are connected to the terminals 17a to 17d, while the transparent electrodes 15a to 15d are connected to the terminals 18a to 18d and the third transparent electrodes 16A and 16B are connected to the terminals 19a and 19b, respectively. Meanwhile, the terminals 17 to 19 are connected to electrical voltage forcing means, not shown.

The transparent electrodes 14a to 14d of the first set and the transparent electrodes 15a to 15d of the second set are maintained at respective equal potential values. If the electrical voltage is forced to the terminals 17, 18 and 19 by voltage forcing means, not shown, silver dissolved in the non-aqueous solvent is precipitated and deposited on the surfaces of the transparent electrodes 14a to 14d and 15a to 15d, so that the annular mounting areas of the diaphragm device 10 in register with these transparent electrodes 14a to 14d and 15a to 15d are changed over from the transparent state to the light-interrupting state. Consequently, if the electrical voltage is forced to the third transparent electrode 16, while being forced to the transparent electrodes 14 and 15 in a sequence of proceeding from the outer most transparent electrodes 14d, 15d towards the inner most transparent electrodes 14a, 15a, the transparent area becomes progressively narrow for controlling the transmission aperture diameter for the incident light. With the above-described diaphragm device 10, the F number at the time of the maximum opening of the diaphragm device 10, with all of the transparent electrodes 14a to 14d of the first set of transparent electrodes 14 and the transparent electrodes 15a to 15d of the second set of transparent electrodes 15 being transparent, is set to 1.4, while the F number at the time of the minimum opening of the diaphragm device, with only the innermost transparent electrodes 14a, 15a being transparent, is set to 8. On the other hand, the transmittance of the electrochromic element 11 is set to 100% and 1% for the light transmitting state and for the light interrupting state, respectively, while the transmittance of the transparent electrode is assumed to be lowered by 10% per layer.

With these pre-set values taken into consideration, since the diaphragm device 10 is of a dual layer structure having the first set 14 of the transparent electrodes and the second set of the transparent electrodes 15 mounted on the front and reverse surfaces of the electrochromic element 11, respectively, the transmittance of the incident light is $(1-0.1)^2 = 0.9^2$. Consequently, the ratio of the light volume leaking from the light interrupting area to the light volume passed through the transparent area at the time of the minimum opening of the diaphragm device 10, that is the S/N ratio, may be calculated from the equation:

(light volume leaking through areas in register with the transparent electrodes 14b–15b, 14c–15c and 14d–15d)/ (light volume transmitted through areas in register with the transparent electrodes 14a–15a)=(surface measure of the areas in register with the transparent electrodes 14b–15b, 14c–15c and 14d–15d)×(transmittance)/(surface measure of the area in register with the transparent electrodes 14a–15a)×(transmittance).

Substituting the above pre-set values into the above equation, $[(8/1.4)^2-1]\times(0.01)^2\times(0.9)^2/[1^2\times(0.9)^2] = 0.0032$. Thus the S/N ratio has a value equivalent to that of a four-layer diaphragm device 8, so that it is apparent that the light interrupting properties sufficient as the diaphragm device for a camera may be maintained. On the other hand, the decrease in the transmittance of the incident light for the diaphragm device 10 comprising two layers of the transparent electrodes is $(0.9)^2=0.81$, so that the light volume is increased by about 23% as compared to that of the above-mentioned diaphragm device 8 having the four layers of the transparent electrodes.

Figure 3:
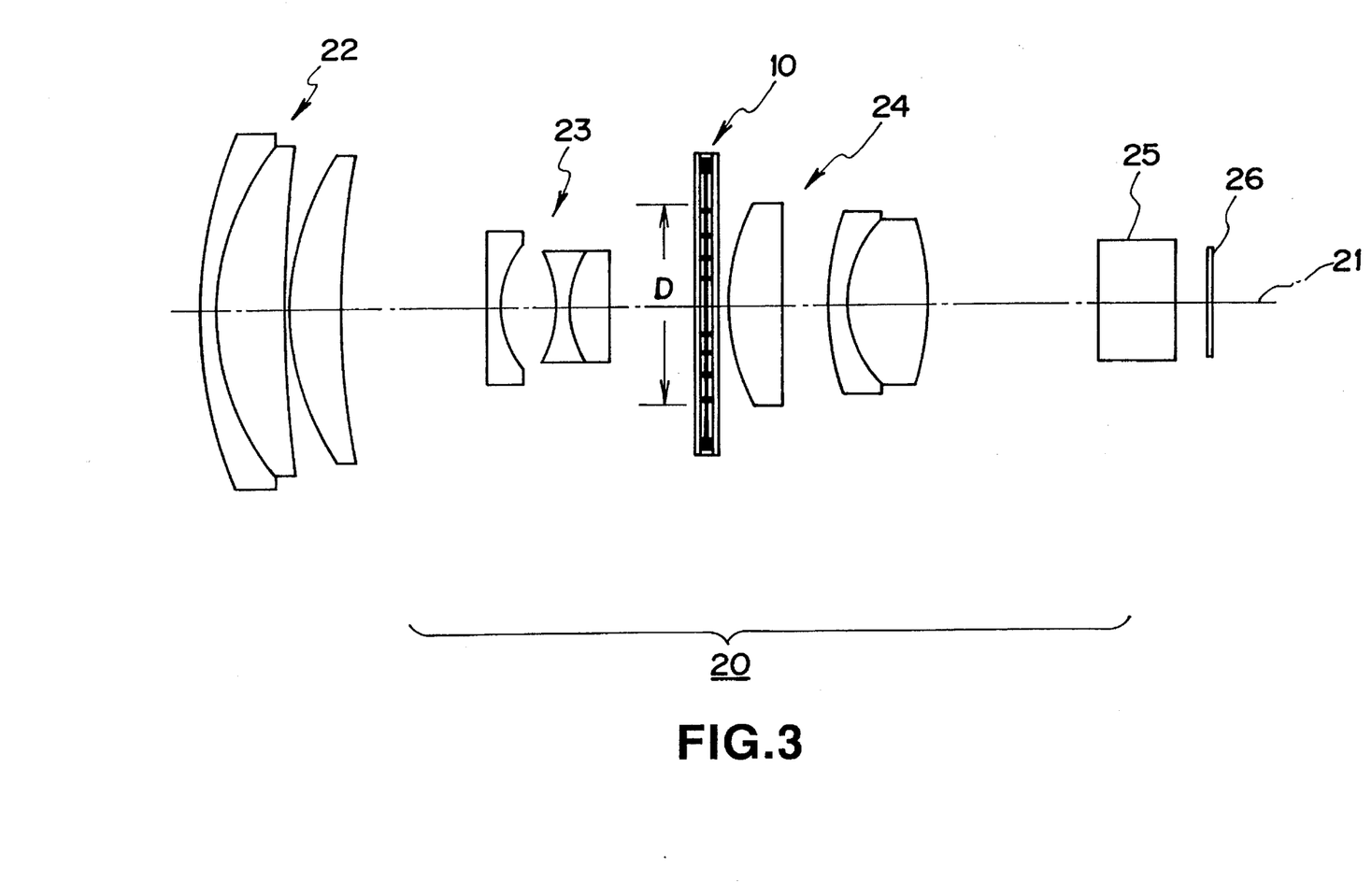
FIG. 3 is a schematic exploded side view showing an image pickup lens system having the diaphragm device shown in FIG. 1.

The above-described diaphragm device 10 is built into an image pickup lens system 20 shown in FIG. 3. The image pickup lens system 20 includes, from the front side on, a front lens unit 22, a zoom unit 23 (varietur), the diaphragm device 10, an inner focusing unit 24 made up of a fixed lens and a set of movable lenses, a low-pass filter 25 made up of an IR absorption glass, a CCD cover glass and face-parallel plates, and a CCD sensor 26.

Thus the incident light incident on the image pickup lens system 20 from the front lens unit 22 is led via the zoom unit 23 to the diaphragm device 10. The controlling operation for controlling the transmission opening diameter of the incident light by the diaphragm device 10 is by supplying a digital output of an A/D converter of the CD sensor 26 based on the light volume transmitted through the diaphragm device 10, low-pass filter 25 and the CCD sensor 26 to the third transparent electrodes 16 and the terminals of the first set 14 of the transparent electrodes and the second set 15 of the transparent electrodes via an encoder beginning from the outer periphery and proceeding towards the inner periphery.

It is noted that the diaphragm device 10 has the thickness equivalent to that of the conventional diaphragm device 1 shown in FIGS. 7 and 8, having a single electrochromic element and two transparent electrodes, so that the lens-to-lens distance of the zoom unit 23 or that of the inner focusing unit 24 arranged ahead and at back of the diaphragm device 10 is not increased and hence the overall length of the image pickup lens system 20 or the front lens diameter may be maintained to be equivalent to those of the conventional image pickup lens system.

On the other hand, since the third transparent electrodes 16 of the present diaphragm device 10 are arranged outwardly of the effective diameter D of the image pickup lens system, the diaphragm device 10 is larger in diameter as compared to the conventional diaphragm device. However, as may be seen from FIG. 3, the diaphragm device 10 is not increased in diameter beyond the size of projection of the front lens unit 22 which is increased in diameter, so that there is no risk of the lens barrel being increased in diameter. Nevertheless, the image pickup lens system 20 exhibiting high transmittance of the incident light and superior light-interrupting properties may be constructed with an extremely compact size.

Figure 4:
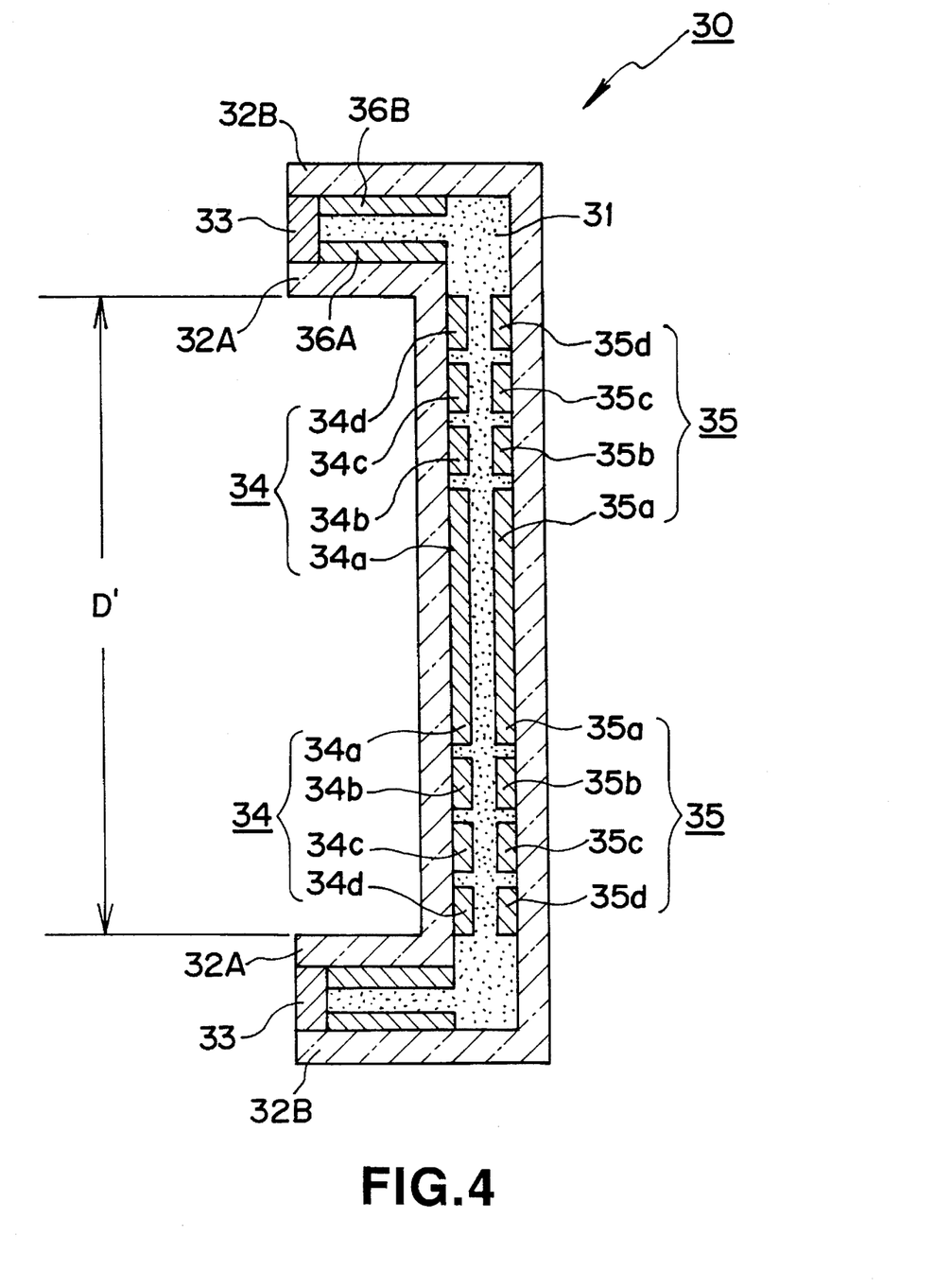
FIG. 4 is a longitudinal cross-sectional view of a diaphragm device according to a second embodiment of the present invention.

FIG. 4 shows a diaphragm device 30 according to a modified embodiment of the present invention. Similarly to the diaphragm device 10 of the preceding embodiment, the diaphragm device 30 includes an electrochromic element 31 encircled by a pair of transparent substrates 32A, 32B and a spacer 33, a first set 34 of concentrically arranged transparent electrodes 34a to 34d and a second set 35 of concentrically arranged transparent electrodes 35a to 35d, on both surfaces of the electrochromic element 31, and third transparent electrodes 36A, 36B arranged on the outer peripheries of the first set 34 of the transparent electrodes and the second set 35 of the transparent electrodes, respectively, Thus the diaphragm device 30 has the basic constitution in common with the diaphragm device 10 of the preceding embodiment.

Meanwhile, the electrochromic element 11 of the diaphragm device 10 of the preceding embodiment is encircled by the glass substrates 12A, 12B, whereas the transparent substrates 32A, 32B in the present embodiment are formed of transparent synthetic resin, such as PMMA, in view of its excellent workability.

With the above-described diaphragm device 30, the third transparent electrode 36 is arranged outwardly of the effective diameter D' of the optical system, while being bent parallel to the optical axis of the lens system, so that the diaphragm device 30 presents a U-shaped cross-section profile, as will be explained subsequently. Thus the optical characteristics of the present diaphragm device, such as light transmittance or light interrupting properties, are naturally equivalent to those of the previously explained diaphragm device 10.

Figure 5:
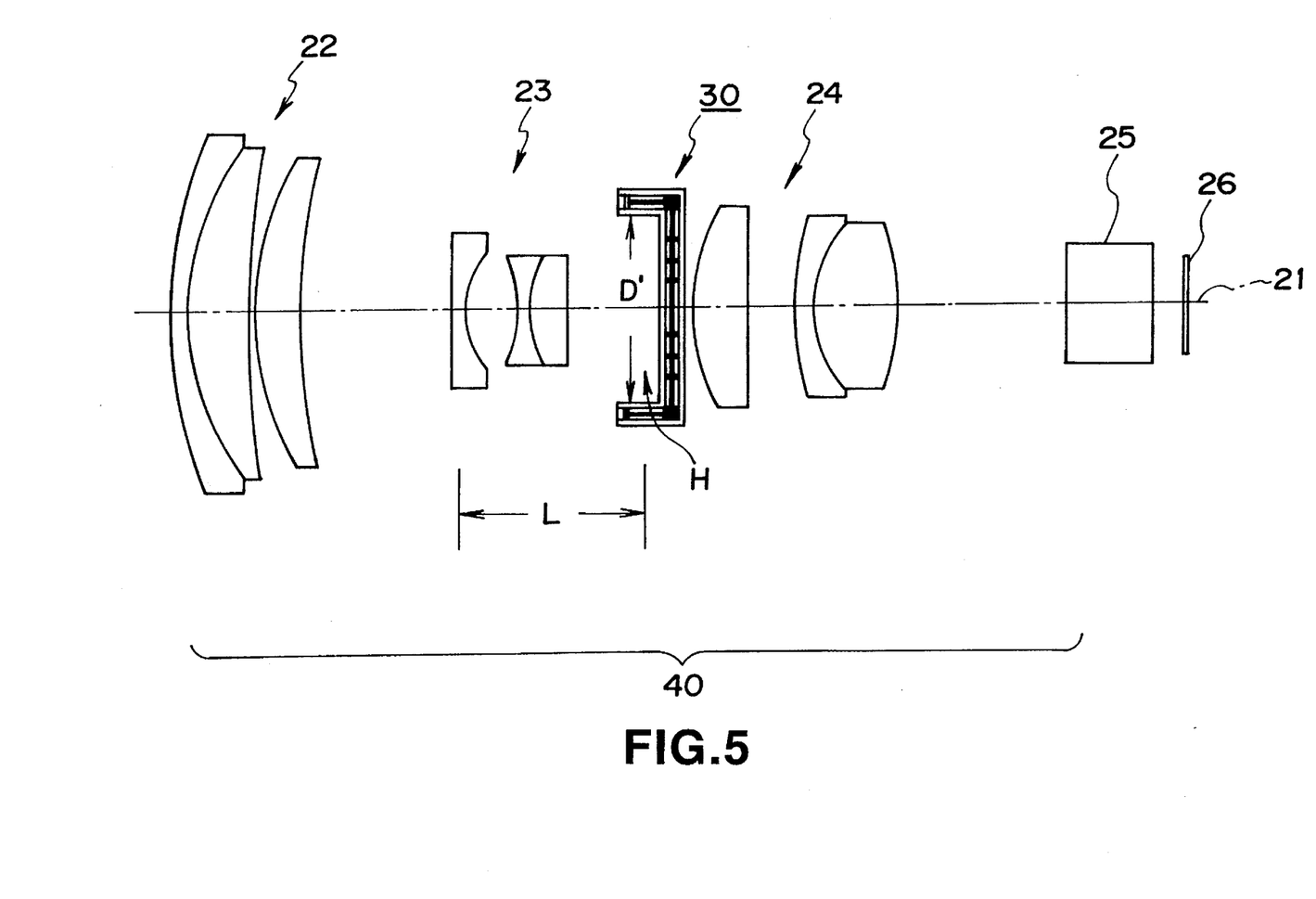
FIG. 5 is a schematic exploded side view showing an image pickup lens system having the diaphragm device shown in FIG. 4.

The diaphragm device 30 is built into an image pickup device 40 shown in FIG. 5. The constitution of the image pickup lens system 40, other than that of the diaphragm device 30, is the same as that of the image pickup lens system 20 shown in FIG. 3, and the parts or components are denoted by the same numerals, so that the corresponding description is not made herein for brevity.

With the above-described diaphragm device 30, the third transparent electrodes 36, constituting the counter-electrodes of the first set 34 of the transparent electrodes and the second set 35 of the transparent electrodes, are bent forwards in parallel with the optical axis, so that a space H having a width corresponding to the effective diameter D' of the image pickup lens system is defined towards the front lens unit 22, as shown in FIG. 5. The image pickup lens system 40 may be rendered compact in size in the longitudinal direction by utilizing the space H of the diaphragm device 30 as the sphere of movement for a zoom unit 23 constituting the so-called varietur. The diaphragm device 30 is also compact in size in the radial direction and other components of the image pickup lens system may be arranged in the vicinity of the diaphragm device 30 for further reducing the lens barrel size.

Figure 6:
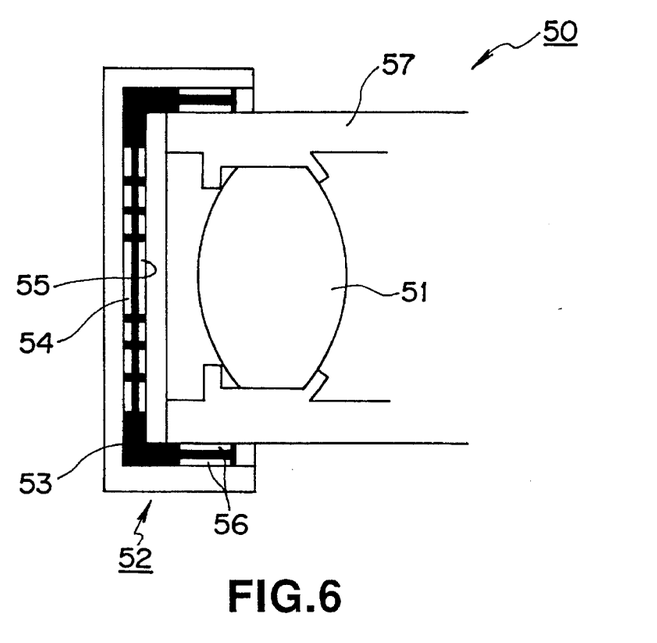
FIG. 6 is a schematic side view showing a front iris type image pickup lens system having a diaphragm device according to a third embodiment of the present invention.

FIG. 6 shows a so-called front iris type image pickup lens system 60 having a diaphragm device 52 arranged ahead of a front lens 51. Since the diaphragm device 52 is arranged ahead of the front lens 51 in the present front-iris type image pickup lens system 50, the thickness of the image pickup lens system 50 is determined by the outer diameter of the diaphragm device 52.

The diaphragm device 52 has its basic structure in common with the diaphragm device 30 of the preceding second embodiment, so that detailed description is not made herein for brevity. In sum, the third transparent electrodes 56, constituting the counter-electrodes of the first set 54 of the transparent electrodes and the second set 55 of the transparent electrodes, are bent parallel to the optical axis, so that the device 52 in its entirety presents a cap-like shape.

The inner diameter of the diaphragm device 52, in other words, the effective diameter of the image pickup lens system, is approximately equal to the outer diameter of the lens barrel 57, so that the diaphragm device 52 may be mounted at the opening of the lens barrel 57 in the vicinity of the front lens 51. The image pickup lens system 50, having the diaphragm device 52 mounted therein, is of a smaller gauge and compact in size, while being excellent in light transmittance and light interrupting characteristics.

Although the first set of the transparent electrodes and the second set of the transparent electrodes are arranged in concentric circles in the above-described embodiments, they may also be arranged in concentric lozenge or ellipses. The transparent electrodes of the first set of the transparent electrodes and the second set of the transparent electrodes facing each other may be arranged with an offset insofar as such offset is not obstructive to the light interrupting characteristics. The third electrodes constituting the counter-electrodes relative to the first set of the transparent electrodes and the second set of the transparent electrodes are arranged outside of the effective diameter of the optical system and hence there is no particular necessity for using transparent electrodes as these third electrodes.

What is claimed is:

1. A diaphragm device comprising:

an electrochromic element the light transmitting properties of which are changed on forcing an electrical voltage thereacross, a first set of transparent electrodes and a second set of transparent electrodes each having a concentric array of a plurality of transparent electrodes, said first set of the transparent electrodes and the second set of the transparent electrodes being arranged on both sides of said electrochromic element, and third electrodes arranged on both sides of the electrochromic element constituting counter-electrodes for said first set of the transparent electrodes and the second set of the transparent electrodes, said third electrodes being arranged on the outermost peripheries of said first set of the transparent electrodes and the second set of the transparent electrodes.

2. A diaphragm device employed in an optical system comprising:

an electrochromic element the light transmitting properties of which are changed on forcing an electrical voltage thereacross, a first set of transparent electrodes and a second set of transparent electrodes each having a concentric array of a plurality of transparent electrodes, said first set of the transparent electrodes and the second set of the transparent electrodes being arranged on both sides of said electrochromic element within an effective diameter of the optical system, and third electrodes arranged on both sides of the electrochromic element constituting counter-electrodes for said first set of the transparent electrodes and the second set of the transparent electrodes, said third electrodes being arranged on the outermost peripheries of said first set of the transparent electrodes and the second set of the transparent electrodes outside of the effective diameter of the optical system.

3. The diaphragm device employed in an optical system as claimed in claim 2 wherein the third electrodes arranged outside of the effective diameter of the optical system for forming the counter-electrodes for said first set of the transparent electrodes and the second set of the transparent electrodes are bent along the optical axis of the optical system with respect to said first set of the transparent electrodes and the second set of the transparent electrodes.

4. The diaphragm device employed in an optical system as claimed in claim 3 wherein the third electrodes arranged outside of the effective diameter of the optical system are bent in parallel with the optical axis of the optical system with respect to said first set of the transparent electrodes and the second set of the transparent electrodes.

* * * * *